United States Patent [19]

Matsuyama et al.

[11] Patent Number: 4,860,371
[45] Date of Patent: Aug. 22, 1989

[54] METHOD AND APPARATUS FOR DETECTING PATTERN DEFECTS

[75] Inventors: Yukio Matsuyama; Toshiaki Ichinose, both of Yokohama, Japan

[73] Assignee: Hitachi, Ltd., Tokyo, Japan

[21] Appl. No.: 76,213

[22] Filed: Jul. 22, 1987

[30] Foreign Application Priority Data

Jul. 28, 1986 [JP] Japan ................. 61-175502

[51] Int. Cl.$^4$ ............................................. G06K 9/00
[52] U.S. Cl. .................................... 382/8; 356/344; 358/101; 382/50
[58] Field of Search ............... 382/8, 27, 50; 388/101, 388/106; 356/390, 394, 388

[56] References Cited

U.S. PATENT DOCUMENTS

| | | | |
|---|---|---|---|
| 3,104,372 | 9/1963 | Rabinow et al. | 382/50 |
| 4,242,662 | 12/1980 | Tsujiyama et al. | 382/8 |
| 4,371,865 | 2/1983 | Moulton | 382/50 |
| 4,475,234 | 10/1984 | Nishijima et al. | 382/50 |
| 4,491,961 | 1/1985 | Sutton et al. | 382/50 |
| 4,614,430 | 9/1986 | Hara et al. | 382/8 |
| 4,648,053 | 3/1987 | Fridge | 358/101 |
| 4,700,225 | 10/1987 | Hara et al. | 358/106 |
| 4,741,044 | 4/1988 | Polomsky et al. | 382/8 |

*Primary Examiner*—Leo H. Boudreau
*Assistant Examiner*—Joseph Mancuso
*Attorney, Agent, or Firm*—Antonelli, Terry & Wands

[57] ABSTRACT

System for detecting pattern defects wherein images of corresponding portions of two originally identical patterns are detected and two image signals representing the images are registered with each other, a second image signal of the two registered signals is shifted by a predetermined number of pixels with respect to a first image signal, thus providing shifted second image signals. Differences in brightness between the first and second image signals as well as each of the shifted second image signals are calculated within intervals corresponding to pixels on one scanning line, thus providing a first group of difference image signals, preset values are added to and substracted from the first or second image signal to provide a sum image signal and a substraction image signal. Differences in brightness between the second or first image signal and each of the sum and substraction image signals are calculated within the intervals to provide a second group of at least two difference signals, normality of one of the two patterns is decided when the first group of difference signals and the second group of difference signals have coexistent positive and negative signs within one interval and a minimum of absolute values of the first group of difference signals and the second group of difference signals is calculated when the first and second group of difference signals have all either positive signs or negative signs within one interval, and the mimimum is detected as a true defect when the minimum exceeds a predetermined threshold.

11 Claims, 5 Drawing Sheets

F I G. 3
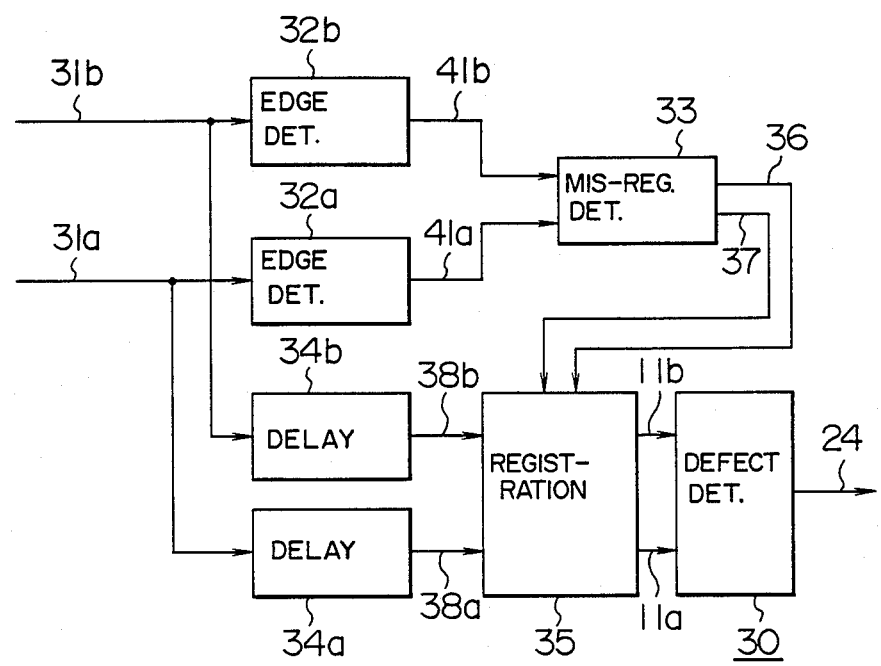

FIG. 4 a
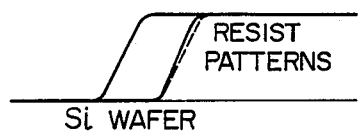
FIG. 4 b
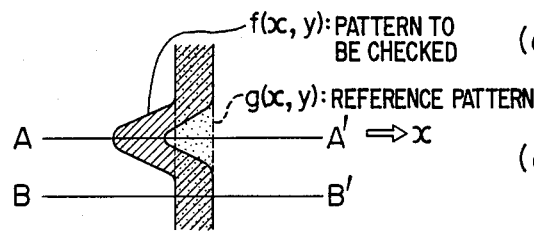
FIG. 4 c
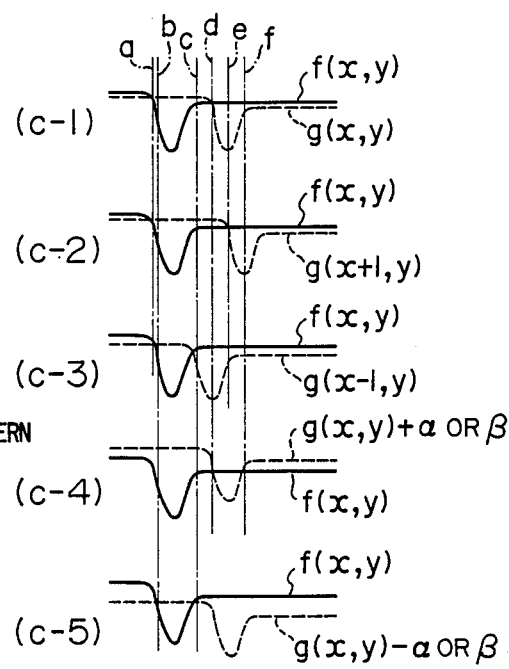
FIG. 4 d
| INTER-<br>VAL<br>d.<br>IMAGE<br>SIG. | ~a | a~b | b~c | c~d | d~e | e~f | f~ |
|---|---|---|---|---|---|---|---|
| D5 | Neg. | Pos. | Pos. | Pos. | Neg. | Neg. | Neg. |
| D6 | Neg. | Pos. | Pos. | Pos. | Pos. | Neg. | Neg. |
| D4 | Neg. | Pos. | Pos. | Neg. | Neg. | Neg. | Neg. |
| D10 | Pos. | Pos. | Pos. | Pos. | Neg. | Neg. | Pos. |
| D11 | Neg. | Neg. | Pos. | Neg. | Neg. | Neg. | Neg. |
| | G (GOOD) | G | D (DEFECTIVE) | G | G | D | G |

| INTERVAL<br>d.<br>IMAGE SIG. | ~g | g~h | h~i | i~j | j~k | k~l | l~ |
|---|---|---|---|---|---|---|---|
| $D_5$ | Pos.~Neg. | Pos.~Neg. | Pos.~Neg. | Pos.~Neg. | Pos.~Neg. | Pos.~Neg. | Pos.~Neg. |
| $D_6$ | Pos.~Neg. | Pos.~Neg. | Pos. | Pos. | Neg. | Neg. | Pos.~Neg. |
| $D_4$ | Pos.~Neg. | Neg. | Neg. | Pos. | Pos. | Pos.~Neg. | Pos.~Neg. |
| $D_{10}$ | Pos. | Pos. | Pos. | Pos. | Pos. | Pos. | Pos. |
| $D_{11}$ | Neg. | Neg. | Neg. | Neg. | Neg. | Neg. | Neg. |
|  | G | G | G | G | G | G | G |

METHOD AND APPARATUS FOR DETECTING PATTERN DEFECTS

BACKGROUND OF THE INVENTION

This invention generally relates to pattern defect detection and more particularly to a pattern defect detecting method and apparatus suitable for highly reliable checking of defects in a semiconductor device circuit pattern on an LSI wafer in the form of a resist pattern before etching.

Illustrated at sections (a) and (b) in FIG. 1 are enlarged views of a part of a circuit pattern on a semiconductor wafer, with a perfect pattern 1 of the part devoid of any defects illustrated at (a) in FIG. 1 and a defective pattern 3 of the same part inclusive of a projection 2a, a break in a wire 2b and an isolated defect 2c illustrated at (b) in FIG. 1. Conventionally, in order to check defects in the circuit pattern, a reference pattern on a wafer and a pattern to be checked which is formed on the same wafer are imaged, two images of these patterns are compared to each other, and any portion at which the two images differ from each other is determined to be a defect.

In the above method, however, even when the reference pattern and the pattern to be checked which are formed on the same wafer and picked up by means of image pickup devices are located in perfect register relationship with each other, mis-registration occurs as illustrated at (c) in FIG. 1 between the reference pattern 1 (dotted line) and the checked pattern 3 (solid line) at portions other than the defective portions 2a to 2c. Presumably, the above mis-registration is caused for the reasons described below.

(a) The two patterns are formed in delicately different configurations, though not leading to occurrence of defects, during wafer production processes such as exposure, development and etching.

(b) The pattern images are distorted owing to aberration of optical systems for imaging the two patterns to be compared with each other and to errors in travel of stages carrying the wafers.

Consequently, as illustrated at (d) in FIG. 1, mis-registration between the reference pattern 1 and the check pattern 3 occurs at portions other than defective portions 2a' to 2c', especially, at the pattern contour, resulting in spurious defects 4.

A method for elimination of such spurious defects 4 has been proposed as disclosed in, for example, Japanese Patent Publication No. 54-37475. According to this proposal, mis-register portions between a reference pattern and a pattern to be checked are detected as candidates for defects and at the same time, only the pattern contour is extracted from either of the reference pattern and the check pattern. Then, portions common to the pattern contours of the respective reference and check patterns are extracted from the two pattern contours, and some of the candidates for defects sorted out as the common contour portions are recognized as spurious defects and excluded to thereby detect only true defects.

The second conventional method succeeds in detecting the break 2b and isolated defect 2c shown at (b) in FIG. 1 but this method can not satisfactorily detect the small projection 2a which occurs at the pattern contour and is likely to be covered by a common contour portion mentioned above. If the size of individual pixels used for pattern detection is decreased to meet the detection of such a small defect, then checking speeds will be decreased and throughput of the checking apparatus will disadvantageously be degraded.

A method disclosed in Japanese Patent Publication No. 59-42904 may be employed as a defect checking method which is not affected by the delicate size difference between the comparative patterns and the image distortion. In this conventional method, featuring points of the two comparative patterns, such as points of inflexion, are extracted from these patterns. Normality is recognized when the featuring points of both the patterns fall within a permissible range of a predetermined amount of mis-registration but the presence of a defect is determined when a featuring point of one pattern lies and a featuring point of the other pattern does not lie within the permissible range.

Accordingly, the last-mentioned method succeeds in accommodating the delicate size difference between the two patterns and the image distortion to the permissible mis-registration, thus preventing generation of spurious defects. But, disadvantageously, all defects of a variety of configurations are difficult to detect in terms of the featuring point and there is a possibility that a small defect is accidentally overlooked. Further, when the pattern is thick or thin as a whole, a size difference between the comparative patterns which is to be detected as a defect is disadvantageously accommodated to the permissible mis-registration and accepted.

Incidentally, in recent years, semiconductor integrated circuits have been realized with very highly integrated circuits of very high density and fine defects present in circuit patterns do harm to the operation of the circuits with high probabilities. In the prior art, however, the detection of small defects can not be accomplished without increasing the probability of detecting spurious defects. Under these circumstances, the advent of an expedient capable of detecting only true defects without detection of spurious defects is desired urgently.

SUMMARY OF THE INVENTION

An object of the invention is to eliminate the prior art drawbacks and provide a method and apparatus for detecting pattern defects capable of detecting small defects with high reliability and at high speeds, without generating spurious defects.

According to one aspect of the invention, there is provided a method of detecting pattern defects comprising the steps of : detecting images of corresponding portions of two patterns which are originally identical to each other and registering two image signals representative of the images; shifting a second image signal of the two registered image signals by a predetermined number of pixels with respect to a first image signal in X and Y directions defining scanning directions for the two registered image signals, thus providing shifted second image signals, and calculating differences in brightness between the first image signal and the second image signal, and between the first image signal and each of the shifted second image signals within intervals corresponding to pixels on the two-dimension local memory, thus providing a first group of difference image signals ; adding and subtracting preset values to and from the first image signal or the second image signal to provide a sum image signal and a subtraction image signal and calculating differences in brightness between the second image signal or the first image signal and each of the sum and subtraction image signals within the intervals to provide a second group of at least two difference image signals; deciding normality of one of the two patterns when the first group of difference image signals and the second group of difference image signals have coexistent positive and negative signs within one interval and calculating a minimum of absolute values of the first group of difference image signals and the second group of difference image signals when the first group of difference image signals and the second group of difference image signals have all either positive signs or negative signs within one interval; and detecting the minimum as a true defect when the minimum exceeds a predetermined threshold.

According to another aspect of the invention, there is provided an apparatus of detecting pattern defects comprising a plurality of image pickup devices for picking up patterns which are originally identical to each other and producing a signal representative of an image to be checked and a signal representative of a reference image; a mis-registration detector for detecting an amount of mis-registration between the check image signal and the reference image signal produced from the respective image pickup devices; a registration circuit for correcting the relation between the check image and reference image signals by an electrical delay which corresponds to the amount of mis-registration detected by the mis-registration detector and registering the check image and reference image signals with each other; an image windowing circuit for shifting a second image signal of the two registered image signals from the registration circuit by a predetermined number of pixels with respect to a first image signal in X and Y directions defining scanning for the registered image signals and establishing windowed image signals of the first and second image signals; a difference image signal extracting circuit for calculating differences in brightness between the first image signal and the second image signal as well as between each of the windowed image signals of the first image signal and each of the shifted windowed image signals of the second image signal within intervals corresponding to pixels on one scanning line, thus providing a first group of difference image signals, adding and subtracting preset values to and from the first image signal or the second image signal to provide a sum image signal and a subtraction image signal and calculating differences in brightness between the second image signal or the first image signal and each of the sum and subtraction image signals within the intervals, thus providing a second group of at least two difference image signals; a first defect deciding circuit for deciding normality of the check pattern when the first group of difference image signals and the second group of difference image signals have coexistent positive and negative signs within one interval and calculating and delivering a minimum of absolute values of the first group of difference image signals and the second group of difference image signals when the first group of difference image signals and the second group of difference image signals have all either positive signs or negative signs within one interval; and a second defect deciding circuit for erasing the minimum delivered out of the first defect deciding circuit when the minimum does not reach a predetermined threshold and detecting the minimum as a true defect when the minimum exceeds the predetermined threshold.

Thus, according to the invention, even when the two images can not be registered perfectly with each other because of their slightly irregular pattern contours and they have varying brightness, spurious defects will not be detected as defects and only true defects can be detected.

BRIEF DESCRIPTION OF THE DRAWINGS

FIG. 3 is a block diagram of an image processing apparatus incorporating the defect detection circuit of FIG. 2;

DESCRIPTION OF THE PREFERRED EMBODIMENTS

Figure 4:
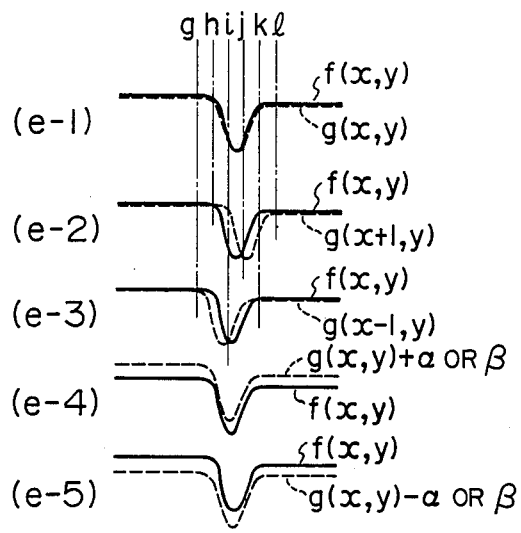
FIG. 4a is a fragmentary sectional view showing overlapped two resist patterns which are examined in accordance with the invention.
FIG. 4b is a diagram showing a reference pattern image g(x,y) and a check pattern image f(x,y) obtained when image pickup devices pick up the resist patterns shown in FIG. 4a, wherein the pattern images are placed in register relationship with each other.
FIG. 4c illustrates a waveform of a check pattern image signal related to a waveform of a reference pattern image signal and to waveforms of ±1 pixel shifted reference pattern image signals, these image signals being obtained on the scanning line A—A' of FIG. 4b.
FIG. 4d shows signs of difference image signals obtained within intervals on the scanning line A—A' of FIG. 4b.
FIG. 4e illustrates waveforms similar to those of FIG. 4c but obtained on the scanning line B—B' of FIG. 4b.
FIG. 4f shows signs of difference image signals obtained within intervals on the scanning line B—B' of FIG. 4b.

A preferred embodiment of the invention will now be described with reference to FIGS. 2 through 4.

Figure 1:
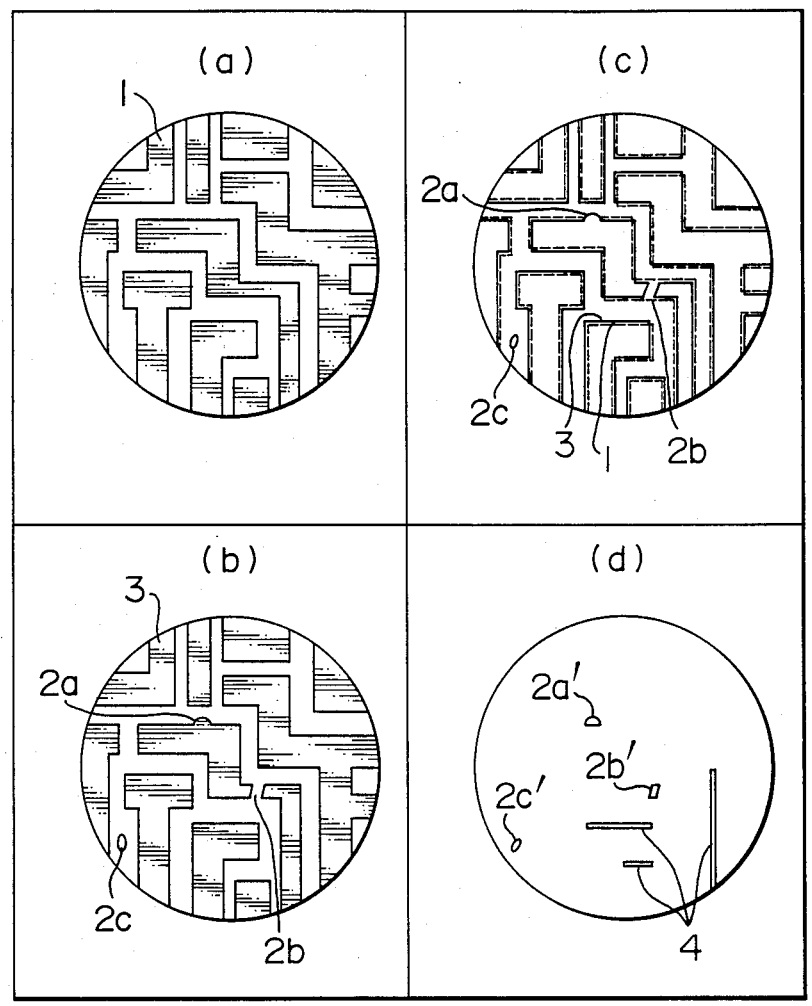
FIG. 1 illustrates at sections (a) through (d) diagrams useful to explain prior art pattern defect detecting methods.
Figure 2:
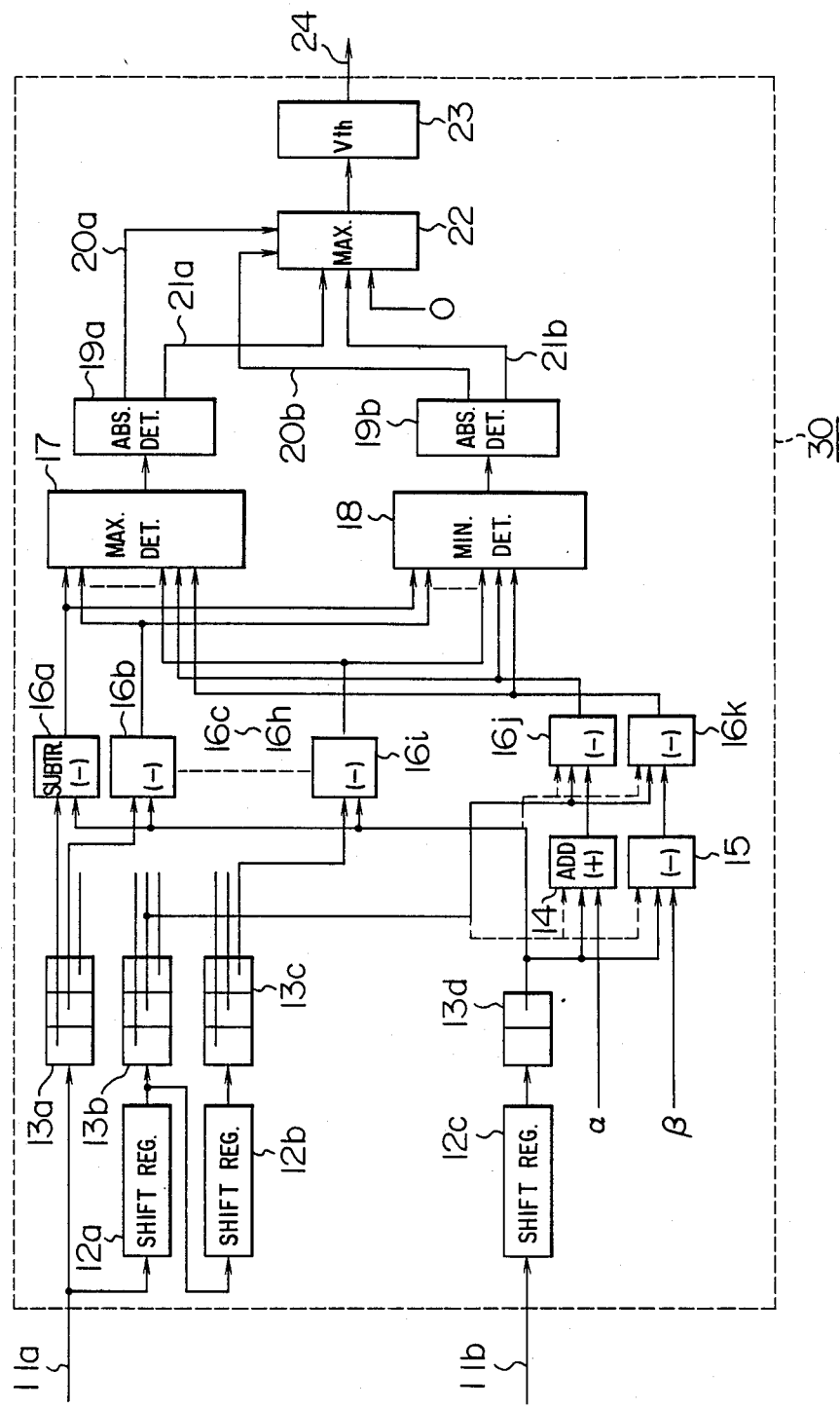
FIG. 2 is a block diagram showing a defect detection circuit used for method and apparatus for detecting pattern defects according to an embodiment of the invention.

FIG. 2 illustrates, in block form, a defect detection circuit 30 used for practicing a method and apparatus for checking resist pattern defects before etching in accordance with teachings of the invention. Referring to FIG. 2, a reference image 11a represented by a digital signal is produced from an image pickup device and an image to be checked 11b also represented by a digital signal is produced from another image pickup device, both of the images being placed in register relationship with each other by the registration circuit shown in FIG. 3. The reference image 11a represented by the digital signal is a local image of 3×3 pixels which is windowed by means of shift registers 12a and 12b respectively adapted to store pixels per scanning line of a frame image and serial-in/parallel-out shift registers 13a, 13b and 13c. On the other hand, pixels per scanning line of a frame image for the image to be checked 11b, represented by the digital signal, are stored in a similar shift register 12c and then supplied to a serial-in/parallel-out shift register 13d so that an output signal from the second digit of the shift register 13d can be synchronized with a center pixel of the local image. Subsequently, the second digit output signal from the shift register 13d, designated by f(x,y), is subtracted from output signals representative of individual pixels, delivered out of the shift registers 13a to 13c and designated by g(x+i, y+j)i,j=−1, 0, +1, by means of subtracters 16a to 16i to provide difference images $$D_n(x,y)_{n=1\sim 9} = g(x+i, y+j)_{i=-1,0,+1; j=-1,0,+1} - f(x,y)$$

between the image to be checked 11b and the reference image 11a as well as images obtained by ±1 pixel shifting the reference image 11a in X and Y directions defining scanning for the registered images, where x and y represent coordinates of the center pixel delivered out of the center digit of the shift register 13b. More specifically, the subtracter 16a produces a difference image signal $D_1(x,y)=g(x-1,y-1)-f(x,y)$, the subtracter 16b a difference image signal $D_2(x,y)=g(x,y-1)-f(x,y)$, the subtracter 16c a difference image signal $D_3(x,y)=g(x+1,y-1)-f(x,y)$, the subtracter 16d a difference image signal $D_4(x,y)=g(x-1,y)-f(x,y)$, the subtracter 16e a difference image signal $D_5(x,y)=g(x,y)-f(x,y)$, the subtracter 16f a difference image signal $D_6(x,y)=g(x+1,y)-f(x,y)$, the subtracter 16g a difference image signal $D_7(x,y)=g(x-1,y+1)-f(x,y)$, the subtracter 16h a difference image signal $D_8(x,y)=g(x,y+1)-f(x,y)$, and the subtracter 16i a difference image signal $D_9(x,y)=g(x+1,y+1)-f(x,y)$. In this manner, the nine subtracters 16a to 16i provide the nine difference image signals $D_1(x,y)$ to $D_9(x,y)$. On the other hand, the second digit output signal f(x,y)from the shift register 13d is added with a preset value $\alpha$ at an adder 14 which in turn produces an output signal $f(x,y)+\alpha$ and is subtracted by a preset value $\beta$ at a subtracter 15 which in turn produces an output signal $f(x,y)-\beta$. A subtracter 16j subtracts the output signal $f(x,y)+\beta$ of the adder 14 from the signal g(x,y) representative of the center pixel of the (3×3)− pixel local image to produce a difference image signal $D_{10}(x,y)=g(x,y)-\{f(x,y)+\}$. A subtracter 16k subtracts the output signal $f(x,y)-\beta$ of the subtracter 15 from the center pixel signal g(x,y) to produce a difference image signal $D_{11}(x,y)=g(x,y)-\{f(x,y)-\beta\}$. Alternatively, the adder 14 may add the preset value $\alpha$ to the signal g(x,y) representative of the center pixel of the (3×3)-pixel local image, received via a dotted line in FIG. 2, so that the subtracter 16j may produce a difference image signal $\{g(x,y)+\alpha\}-f(x,y)$, and the subtracter 15 may subtract the preset value $\beta$ from the center pixel signal g(x,y), received via a dotted line in FIG. 2, so that the subtracter 16k may produce a difference image signal $\{g(x,y)-\beta\}-f(x,y)$. Obviously, the preset values $\alpha$ and $\beta$ may be equal to each other.

Each of the output signals $D_1(x,y)$, $D_2(x,y)$ —$D_9(x,y)$, $D_{10}(x,y)$ and $D_{11}(x,y)$ from the subtracters 16a to 16k is supplied to a maximum detector 17 and a minimum detector 18. The maximum detector 17 detects a maximum value $\max\{D_n(x,y)\}_{n=1\sim 11}$ from the signals $\{D_n(x,y)\}_{n=1\sim 11}$ and delivers the detected maximum value. An absolute value detector 19a delivers a signal 20a representative of a sign, positive or negative, of the maximum value $\max\{D_n(x,y)\}_{n=1\sim 11}$ and a signal 21a representative of an absolute value $|\max\{D_n(x,y)\}_{n=1\sim 11}|$ of the maximum.

The minimum detector 18 detects a minimum value $\min\{D_n(x,y)\}_{n=1\sim 11}$ from the signals $\{D_n(x,y)\}_{n\sim 11}$ and delivers the detected minimum. An absolute value detector 19b delivers a signal 20b representative of a sign, positive or negative, of the minimum value $\min\{D_n(x,y)\}_{n=1\sim 11}$ and a signal 21b representative of an absolute value $|\min\{D_n(x,y)\}_{n=1\sim 11}|$ of the minimum. A multiplexer 22 is applied with the signal 21a indicative of $|\max\{D_n(x,y)\}_{n=1\sim 11}|$ and the positive or negative sign signal 20a from the absolute value detector 19a, the signal 21b indicative of $|\min\{D_n(x,y)\}_{n=1\sim 11}|$ and the positive or negative sign signal 20b from the absolute value detector 19b, and a signal representative of "0". The multiplexer 22 responds to the positive or negative sign signals 20a and 20b to select and deliver one of the three input signals 21a, 21b and "0". More specifically, the multiplexer 22 connects to the signal "0" to deliver a signal h(x,y)=0 when one of the sign signals 20a and 20b is positive and the other is negative, connects to the signal 21b to deliver a signal $h(x,y)=|\min\{D_n(x,y)\}_{n=1\sim 11}|$ when both the sign signals are positive, and connects to the signal 21a to deliver a signal $h(x,y)=|\max\{D_n(x,y)\}_{n=1\sim 11}|$ when both the sign signals are negative. In other words, when both the sign signals are positive or negative, a signal $h(x,y)=\min\{|\{D_n(x,y)\}_{n=1\sim 11}|\}$ is delivered out of the multiplexer 22. This is because when both the sign signals are negative, all the $\{D_n(x,y)\}_{n=1\sim 11}$ are negative and the $\max\{D_n(x,y)\}_{n=1\sim 11}$ exhibits the minimum absolute value of difference image.

A signal indicative of this minimum absolute value of difference image delivered out of the multiplexer 22 is erased by a threshold circuit 23 when it does not reach a predetermined threshold and a defect signal 24 indicative of a true defect can be delivered out of the threshold circuit 23 only when the minimum exceeds the predetermined threshold.

The above defect checking will be described in greater detail by referring to an example as illustrated in FIGS. 4a to 4f. FIG. 4a shows part of overlapped resist patterns formed on silicon wafers by light exposure. These resist patterns of FIG. 4a are imaged by the separate image pickup devices to provide an overlapped image as illustrated in FIG. 4b. Because of irregular reflection from stepped portions of the patterns, images are darkened at the stepped portions. Further because of light transmission and irregular reflection at the surface of the resist pattern, an image of the resist surface is slightly darkened as compared to an image of the wafer surface. When the overlapped image illustrated in FIG. 4b is scanned in the X direction along the line A—A' of FIG. 4b, an image signal g(x,y) representative of the reference pattern and an image signal f(x,y) representative of the pattern to be checked are related to each other as indicated by waveforms in FIG. 4c. Actually, these image signals are of digital signals but for simplicity of explanation, analog signal waveforms are used herein. Image signals g(x−1,y) and g(x+1,y) representative of reference pattern images subject to ±1 pixel shifting are illustrated on slightly exaggerated pixel shift scale. With reference to FIGS. 4c and 4d, a signal representative of $D_5(x,y)=g(x,y)-f(x,y)$ as indicated at (c−1) in FIG. 4c is produced from the subtracter 16e, a signal representative of $D_6(x,y)=g(x+1,y)-f(x,y)$ as indicated at (c−2) in FIG. 4c is produced from the subtracter 16f, a signal representative of $D_4(x,y)=g(x-1,y)-f(x,y)$ as indicated at (c−3) in FIG. 4c is produced from the subtracter 16d, a signal representative of $D_{10}(x,y)=\{g(x,y)+\alpha\}-f(x,y)$ or $D_{11}(x,y)=g(x,y)-\{f(x,y)+\alpha\}$ as indicated at (c−4) in FIG. 4c is produced from the subtracter 16j and a signal representative of $D_{11}(x,y)=\{g(x,y)-\beta\}-f(x,y)$ or $D_{10}(x,y)=g(x,y)-\{f(x,y)-\beta\}$ as indicated at (c−5) in FIG. 4c is produced from the subtracter 16k, these difference image output signals respectively having signs within different intervals on the scanning line A—A' which are indicated in FIG. 4d. For adjacent scanning lines, signals substantially identical to the output signal of the subtracter 16e are produced from the subtracters 16b and 16h, signals substantially identical to the output signal of the subtracter 16f are produced from the subtracters 16c and 16i, and signals substantially identical to the output signal of the subtracter 16d are produced from the subtracters 16a and 16g. In accordance with signs of these difference image signals, the multiplexer 22 connects to a signal 21b, within an interval b−c, to deliver a signal h(x,y) indicative of the presence of a defect, connects to a signal 21a, within an interval e−f, to deliver a signal h(x,y) indicative of the presence of a defect and connects to the "0" signal, within the other intervals, to deliver a signal h(x,y)=0 indicative of the absence of any defect.

When the image illustrated in FIG. 4b is scanned in the X direction along the line B—B' of FIG. 4b, because of substantial register between the reference pattern g(x,y) and the pattern to be checked f(x,y), difference image signals as shown at (e−1) through (e−5) in FIG. 4e are produced from the corresponding subtracters, wherein signals representative of $D_{10}(x,y)$ and $D_{11}(x,y)$ as indicated at (e−4) and (e−5) in FIG. 4e have positive sign and negative sign, respectively, throughout the intervals, with the result that the multiplexer 22 constantly connects to the "0" signal to deliver a signal h(x,y) indicative of the absence of any defect.

As will be seen from the above, when the difference image signals due to small relative movement of ±1 pixel shift between reference pattern g(x,y) and pattern to be checked f(x,y) and the difference image signals due to small variations in brightness include both positive and negative signs among $D_1$–$D_{11}$ within one interval on one scanning line, the multiplexer 22 connects to the "0" signal, within that interval, to deliver a signal h(x,y) indicative of the absence of any defect. If all the difference image signals $D_1$–$D_{11}$ have positive (or negative) values within one interval, the multiplexer 22 connects to the signal 21a or 21b within that interval, to deliver a signal h(x,y) indicative of the presence of a defect. In case where the reference pattern g(x,y) is only slightly misregistered with the pattern to be checked f(x,y), there is a possibility that the difference image signals $D_1$ to $D_{11}$ have all positive signs or negative signs within one interval but in such an event, the minimum value $h(x,y) = \min\{|\{D_n(x,y)\}_{n=1\sim11}|\}$ of a resulting difference image signal will be so small that h(x,y) < Threshold is satisfied and hence the threshold circuit 23 will not produce any defect signal.

The above-described operation will be summarized as follows:

(1) A reference image represented by an image signal g(x,y) is ±1 pixel shifted by means of the shift registers 13a, 13b and 13c in the X and Y directions, with respect to an image to be checked, represented by an image signal f(x,y), and the differences in brightness between windowed reference images represented by image signals $g(x+i,y+i)_{i=-1,0,+1;j=-1,0,+1}$ and the image signal f(x,y) are calculated by means of the subtracters 16a to 16i, providing nine difference images represented by image signals $\{D_n(x,y)\}_{n=1\sim9}$.

(2) A preset value α is added to and subtracted from the image signal g(x,y) representative of the reference image by means of the adder 14 and the subtracter 15 to provide images represented by image signals g(x,y)±α and the differences in brightness between each of the image signals g(x,y)±α and the image signal f(x,y) representative of the image to be checked are calculated by means of the subtracters 16j and 16k, providing two difference images represented by image signals $D_n(x,y)_{n=10,11}$.

(3) The image signals $D_n(x,y)_{n=1\sim11}$ representative of the difference images, eleven in total, obtained through (1) and (2) as above are processed in accordance with (a) and (b) as below to provide a signal h(x,y).

(a) When $\max\{D_n(x,y)\}_{n=1\sim11} \times \min\{D_n(x,y)\}_{n=1\sim11} < 0$, h(x,y)=0

(b) For the other cases $h(x,y) = \min\{|D(x,y)|\}_{n=1\sim11}$.

(4) In the case of (b) above, the signal h(x,y) is referenced to a predetermined threshold TH so as to be delivered as a defect signal if $h(x,y) \geq TH$.

Accordingly, in the procedure (1), the reference pattern g(x,y) is ±1 pixel shifted in the X and Y directions with respect to the pattern to be checked f(x,y) and the differences from the pattern to be checked f(x,y) are calculated. When difference image signals corresponding to individual pixels have coexistent positive and negative signs, an examined pattern is determined to be normal but when they all have signs of the same polarity, an examined pattern is treated as a candidate for a defect. This candidate pattern is represented by the signal h(x,y) as obtained in the above procedure (3) and is referenced to the threshold in the procedure (4) to ensure that only a true defect can be detected.

The above procedure (2) is employed for the following reasons. In the present invention, with the aim of detecting even a very small defect, two pattern images are compared in brightness before they are converted into binary form. Consequently, slight unevenness in thickness of materials forming the patterns tends to cause a difference in brightness between the images to be compared together and this difference can not be accepted when the registration as merely observed two-dimensionally is perfected, giving rise to erroneous recognition of a normal pattern as a defective pattern.

Thus, in the procedure (2), the preset value α is added to and subtracted from the reference image g(x,y) in order that the polarity of a difference signal obtained even at a portion where a difference in brightness prevails between the image to be checked f(x,y) and the reference image g(x,y) can be inverted, thereby preventing a normal pattern from being recognized as a defective pattern and ensuring detection of only true defects.

As described above, a very small dimensional difference, not evaluated as a defect, between the reference image 11a and the image to be checked 11b can be accepted and only true defects can be detected.

FIG. 3 illustrates, in block form, the overall construction of an image processing circuit including the defect detection circuit 30 shown in FIG. 2. Referring to FIG. 3, signals 31a and 31b representative of a reference image and an image to be checked which are picked up by photoelectric conversion devices are first fed to edge detectors 32a and 32b, respectively, in preparation for mutual registration at the succeeding stage. In the edge detectors 32a and 32b, the input image signals are subjected to differentiation of second order to provide edge image signals which emphasize pattern edges, these edge image signals being also digitized by the edge detectors 32a and 32b and produced therefrom as binary edge image signals 41a and 41b. A mis-registration detector 33 is responsive to the binary edge image signals to calculate mis-registration between the two patterns for mutual comparison and provides signals 36 and 37 representative of amounts of mis-registration in the X and Y directions. Delay circuits 34a and 34b are buffer memories adapted to store the signals 31a and 31b until the mis-registration between the two patterns has been calculated. Output signals 38a and 38b of the delay circuits 34a and 34b are shifted by means of a registration circuit 35 by amounts indicated by the output signals 36 and 37 of the mis-registration detector 33, thus completing registration between the two patterns. The, thus mutually registered image signals are delivered, as image signals 11a and 11b representative of the reference image and the image to be checked, from the registration circuit 35 and fed to the defect detection circuit 30 constructed as illustrated in FIG. 2 so as to be used for defect detection.

As has been described, according to the present invention, highly reliable defect detection can be achieved without causing spurious defects to attain meritorious effects such as improvements in yield of semiconductor integrated circuits and the like, improvements in reliability of products and reduction in costs.

We claim:

1. A method of detecting pattern defects comprising the steps of:

detecting images of corresponding portions of two patterns which are originally identical to each other and registering two image signals representative of said images;

shifting a second image signal of the two registered image signals by a predetermined number of pixels with respect to a first image signal in X and Y directions defining scanning for said two registered image signals, thus providing shifted second image signals and calculating differences in brightness between said first image signal and said second image signals within intervals corresponding to pixels on one scanning line, thus providing a first group of difference image signals;

adding and subtracting preset values to and from one of said first and second image signals to provide a sum image signal and a subtraction image signal and calculating differences in brightness between the other of said first and second image signals and each of said sum and subtraction image signals within said intervals to provide a second group of at least two difference image signals;

deciding normality when said first group of difference image signals and said second group of difference image signals have coexistent positive and negative signs within one interval and calculating a minimum of absolute values of said first group of difference image signals and said second group of difference image signals when said first group of difference image signals and said second group of difference image signals have all either positive signs or negative signs within one interval; and detecting the minimum as a true defect when said minimum exceeds a predetermined threshold.

2. An apparatus of detecting pattern defects comprising:

a plurality of image pickup devices for picking up patterns which are originally identical to each other and producing a signal representative of an image to be checked and a signal representative of a reference image;

mis-registration detecting means for detecting an amount of mis-registration between the check image signal and the reference image signal produced from the respective image pickup devices;

registration means for correcting the relation between said check image and reference image signals by an electrical delay which corresponds to the amount of mis-registration detected by said mis-registration detecting means and registering said check image and reference image signals with each other;

image windowing means for shifting a second image signal of the two registered image signals from said registration means by a predetermined number of pixels with respect to a first image signal in X and Y directions defining scanning for said registered image signals and establishing windowed image signals of said first and second image signals;

difference image signal extracting means for calculating differences in brightness between said first image signal and said second image signal as well as each of the windowed image signals of said first image signal and each of the shifted windowed image signals of said second image signal within intervals corresponding to pixels on one scanning line, thus providing a first group of difference image signals, adding and subtracting preset values to and from one of said first and second image signals to provide a sum image signal and a subtraction image signal and calculating difference in brightness between the other of said first and second image signals and each of said sum and subtraction image signals within said intervals, thus providing a second group of at least two difference image signals;

first defect deciding means for deciding normality of the check pattern when said first group of difference image signals and said second group of difference image signals have coexistent positive and negative signs within one interval and calculating and delivering a minimum of absolute values of said first group of difference image signals and said second group of difference image signals when said first group of difference image signals and said second group of difference image signals have all either positive signs or negative signs within one interval; and second defect deciding means for erasing the minimum delivered out of said first defect deciding means when said minimum does not reach a predetermined threshold and detecting said minimum as true defect when said minimum exceeds said predetermined thresholds.

3. A pattern defect detecting apparatus according to claim 2 wherein said image windowing means comprises a group of shift registers and memories for windowing pixels delivered out of said group of shift registers.

4. A pattern defect detecting apparatus according to claim 2 wherein said difference image extracting means comprises calculating circuits.

5. A pattern defect detecting apparatus according to claim 2 wherein said first defect deciding means comprises a maximum detector, a minimum detector, absolute value detectors and a multiplexer.

6. A pattern defect detecting apparatus according to claim 2 wherein said second defect deciding means comprises a threshold circuit.

7. A method of detecting pattern detects comprising the steps of:
    producing video signals of a pattern to be checked in the form of a photoresist pattern formed on a substrate and a reference pattern used as a reference by scanning and imaging the respective patterns using respective image pickup devices;
    converting each of said video signals to a digital pixel signal by sampling in synchronism with the scanning to obtain a light and shade image signal to be checked and a reference light and shade image signal, respectively, corresponding to said video signals;
    registering said light and shade image signal to be checked and said references light and shade image signal by registration means and outputting registered image signals;
    shifting said reference light and shade image signal using a first shift register by a predetermined number of pixels sequentially in X and Y directions to cut out a local image of $N \times N$ (N is equal to 3 or larger) pixels designated by reference light and shade pixel group signals $g(x+i, y+j)_{i=-1,0,+1, j=-1,0,+1}$, and at the same time, cutting out said light and shade image signal to be checked using a second shift register, a center pixel thereof corresponding to a center pixel (x,y) of said $N \times N$ pixels being designated by a light and shade pixel signal to be checked $f(x,y)$;
    calculating differences in brightness between the cut-out reference light and shade pixel groups signals $g(x+1, Y+j)_{i=-1,0,+1, j=-1,0,+1}$ and the cut-out light and shade pixel signal to be checked $f(x,y)$ to obtain a first group of difference image signals $D_n(x,y)_{n=1\sim 9} = g(x+1, Y+j)_{i=-1,0,+1, j+1,)+1} - f(x,y)$ sequentially in accordance with said scanning;
    adding and subtracting preset values $\alpha$ and $\beta$ respectively ($\alpha$ and $\beta$ may be the same value) to and from the cut-out reference light and shade pixel signal $g(x,y)$ and the cut-out reference light and shade pixel signal $f(x,y)$ to obtain pixels signals $g(x,y)+\alpha$ and $g(x,y)-\beta$, and pixel signals $f(x,y)+\alpha$ and $f(x,y)-\beta$;
    calculating a difference between said pixel signals $g(x,y)+\alpha$ and $g(x,y)-\beta$ and said light and shade pixel signal to be checked $f(x,y)$, or differences between said pixel signals $f(x,y)+\alpha$ and $f(x,y)-\beta$ and said reference light and shade pixel signal $g(x,y)$ to obtain at least two second difference image signals $D_{10}(x,y) = g(x,y) - f(x,y) + \alpha$ or $g(x,y) - f(x,y) - \alpha$, and $D_{11}(x,y) = g(x,y) - f(x,y) - \beta$ or $g(x,y) - f(x,y) + \beta$ sequentially in accordance with said scanning;
    deciding that there is no defect when it is detected that all said first group of difference image signals $D_n(x,y)_{n=1\sim 9}$ and said second difference image signals $D_{10}(x,y)$ and $D_{11}(x,y)$ obtained simultaneously have coexistent positive and negative signs;
    calculating minimum values $h(x,y) = \min\{|D_n(x,y)|\}_{n=1\sim 11}$ of absolute values of said first and second groups of image signals $D_n(x,y)_{n=1\sim 11}$ when it is detected that all said first group of difference image signals $D_n(x,y)_{n=1\sim 9}$ and said second image signals $D_{10}(x,y)$ and $D_{11}(x,y)$ have all either positive signs or negative signs; and
    detecting a portion $(h(x,y) > TH)$ of said minimum values $h(x,y)$ exceeding a preset threshold value TH as being a true defect.

8. An apparatus for detecting pattern defects comprising:
    image pickup means for producing video signals of a pattern to be checked and a reference pattern used as a reference by scanning and imaging respectively, said pattern to be checked and said reference pattern being identical originally, and for producing a light and shade image signal to be checked and a reference light and shade image signal respectively corresponding to said video signals by sampling each of said video signals in synchronism with said scanning and by converting samples into a digital pixel signal;
    mis-registration detecting means for detecting an amount of mis-registration between said light and shade image signal to be checked and said reference light and shade image signal respectively produced by said image pickup means;
    registration means for registering said light and shade image signal to be checked and said reference light and shade image signal by correcting the amount of mis-registration detected by said mis-registration detecting means by an electrical delay, and for outputting a registered light and shade image signal to be checked and a registered reference light and shade signal in synchronism with said scanning;
    first and second light and shade image signal cut-out means for shifting said reference light and shade image signal registered by said registration means using a first shift register by a predetermined number of pixels sequentially in X and Y directions to cut out as a local image of $N \times N$ (N is equal to 3 or larger) pixels designated by reference light and shade pixel group signals $g(x+i, y+j)_{i=-1,0,+1, j=-1,0,+1}$, and at the same time, cutting out said light and shade image signal to be checked by a second shift register, a center pixel thereof corresponding to a center pixel (x,y) of said $N \times N$ pixels being designated by a light and shade pixel signal to be checked $f(x,y)$;
    difference image signal extracting means for calculating differences in brightness between the cut-out reference light and shade pixel group signals $g(x+1, y+j)_{i=-1,0,+1, j=-1,0,+1}$ and the cut-out light and shade pixel signal to be checked $f(x,y)$ to obtain a first group of difference image signals $D_n(x,y)_{n=1\sim 9} = g(x+1,y+j)_{i=-1,0,+1, j+1,)+1} - f(x,y)$ sequentially in accordance with said scanning, and for adding and subtracting preset values $\alpha$ and $\beta$ ($\alpha$ and $\beta$ may be the same value) respectively to and from said reference light and shade pixel signals $g(x,y)$ and said reference light and shade pixel signal $f(x,y)$ to obtain pixel signals $g(x,y)+\alpha$ and $g(x,y)-\beta$, and pixel signals $f(x,y)+\alpha$ and $f(x,y)-\beta$, and for calculating differences between said pixel signals $g(x,y)+\alpha$ and $g(x,y)-\beta$ and said light and shade pixel signal to be checked $f(x,y)$, or differences between said pixel signals $f(x,y)+\alpha$ and $f(x,y)-\beta$ and said reference light and shade pixel signal $g(x,y)$ to obtain at least two second difference image signals $D_{10}(x,y) = g(x,y) - f(x,y) + \alpha$ or $g(x,y) - f(x,y) - \alpha$, and $D_{11}(x,y) = g(x,y) - f(x,y) - \beta$ or $g(x,y) - f(x,y) + \beta$ sequentially in accordance with said scanning; and defect deciding means for deciding that there is no defect when it is detected that all said first group of difference image signals $D_n(x,y)_{n=1\sim 9}$ and said second difference image signals $D_{10}(x,y)$ and $D_{11}(x,y)$ obtained simultaneously have coexistent positive and negative signs, and for calculating minimum values $h(x,y) = \min\{|D_n(x,y)|\}_{n=1\sim 11}$ of absolute values of said first and second groups of image signals $D_n(x,y)_{n=1\sim 11}$ when it is detected that all said first group of difference image signals $D_n(x,y)_{n=1\sim 9}$ and said second image signals $D_{10}(x,y)$ and $D_{11}(x,y)$ have all either positive signs or negative signs, and for detecting a portion $(h(x,y) > TH)$ of said minimum values $h(x,y)$ exceeding a preset threshold value TH as being a true defect.

9. An apparatus of detecting pattern defects according to claim 8, wherein said pattern to be checked and said reference pattern are photo resist patterns before etching formed on a substrate.

10. An apparatus of detecting pattern defects according to claim 8, wherein said defect detecting means includes maximum and minimum value detecting means for detecting a maximum value $\max\{D_n(x,y)_{n=1\sim 11}\}$ and a minimum value $\min\{|D_n(x,y)_{n=1\sim 11}\}$ of all of said first group of difference image signals $D_n(x,y)_{n=1\sim 9}$ and said second difference image signals $D_{10}(x,y)$ and $D_{11}(x,y)$, and normality detection means for outputting a signal $h(x,y) = 0$ representing normality (no defect) when the product of the maximum value and the minimum value detected by said maximum and minimum values detection means is negative, i.e., $\max\{D_n(x,y)_{n=1\sim 11}\} \times \min\{D_n(x,y)_{n=1\sim 11}\} < 0$.

11. An apparatus of detecting pattern defects according to claim 10, wherein said defect detecting means includes absolute value detecting means for obtaining an absolute value $|\max\{D_n(x,y)_{n=1\sim 11}\}|$, or $|\min\{D_n(x,y)_{n=1\sim 11}\}|$ of each of the maximum value $\max D_n(x,y)_{n=1\sim 11}$ and the minimum value detected by said maximum and minimum values detecting means, and wherein said defect detecting means being adapted to output the absolute value $h(x,y) = |\min\{D_n(x,y)_{n=1\sim 11}\}|$ of the minimum value obtained from said absolute value detecting means when the sign of the product of the maximum value and the minimum value obtained from said maximum and minimum values detecting means is other than negative and when the signs of the maximum value and the minimum value are both positive, and to output the absolute value $h(x,y) = |\max\{D_n(x,y)_{n=1\sim 11}\}|$ of the maximum value obtained from said absolute value detecting means when the sign of the product of the maximum value and the minimum detecting means is other than negative and when the signs of maximum value and the minimum value are both negative, thereby to obtain a minimum value $h(x,y) = \min\{|D_n(x,y)|\}_{n=1\sim 11}$ of the absolute value of said difference image signal $D_n(x,y)_{n=1\sim 11}$, and wherein said defect detecting means includes a multiplexer having said normality deciding means.

* * * * *